Oct. 17, 1967  A. L. RENKEY  3,347,972

INDUCTION FURNACE CONSTRUCTION

Filed March 24, 1965  2 Sheets-Sheet 1

INVENTOR.
ALBERT L. RENKEY
BY
ATTORNEY

Oct. 17, 1967  A. L. RENKEY  3,347,972
INDUCTION FURNACE CONSTRUCTION
Filed March 24, 1965  2 Sheets-Sheet 2
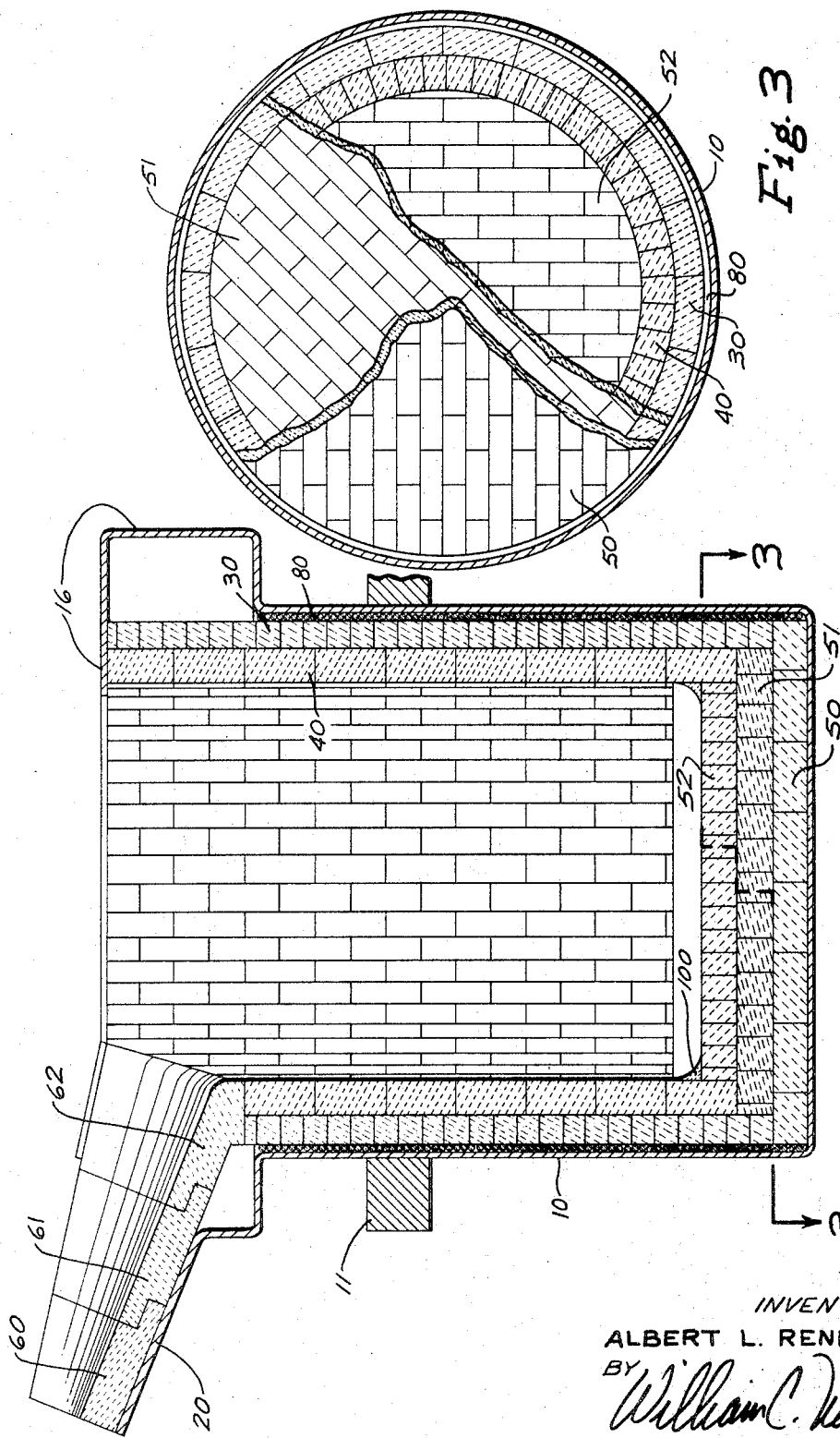
INVENTOR.
ALBERT L. RENKEY
BY
ATTORNEY

3,347,972
INDUCTION FURNACE CONSTRUCTION
Albert Lajos Renkey, Pittsburgh, Pa., assignor to Harbison-Walker Refractories Company, Pittsburgh, Pa., a corporation of Pennsylvania
Filed Mar. 24, 1965, Ser. No. 442,363
9 Claims. (Cl. 13—35)

ABSTRACT OF THE DISCLOSURE

An improved coreless induction furnace construction is provided. It, in essence, is comprised of an outer metal shell with two distinct and independent separate concentric interior lining walls. Each wall is constructed of a plurality of separate brick. Brick in a given wall are laid up differently than brick in the other wall, so joints between brick in the given wall are not in direct communication, to any appreciable extent, with joints in the other wall.

---

This invention relates to an improved induction furnace construction. More particularly, this invention relates to a novel combination of a refractory lining and an induction furnace shell.

Induction furnaces in the United States are growing rapidly both in numbers and capacity, particularly in the ferrous metal working industry. This growth has come after a dormant period of almost three generations, and has resulted from: (1) a great demand for clean, closely controlled products as steel enters its second century, and (2) marked improvements in the equipment and materials required for economic induction furnace operation. When I state that induction furnace art growth has had a dormant period of approximately three generations, I do not wish to infer that there have not been minor improvements in induction furnace construction, nor that induction furnaces have not been used. However, there has been no revolutionary modification of induction furnace construction practices, as far as I know, for many years.

One of the rather startling developments in induction furnace practice has been the marked trend towards considerably larger vessels; for example, to furnaces of over 200 tons capacity. Of course, this recent marked trend towards considerably larger vessels and more automated and superior control arrangements has had a serious effect on refractories previously used to line such furnaces. One result has been use of higher purity refractory materials; but even this has not been the complete answer.

To better understand the change which is now taking place, one has now but to refer to the older patent art; for example, United States Patent No. 2,008,732, of D. L. Summey, which teaches method and apparatus for fabrication of a rammed induction furnace lining. Rammed linings previously have been considered the most desirable form of construction for an induction furnace. A rammed lining has been considered desirable, because it was monolithic in character, i.e., there were no cracks or joints through which molten metal could penetrate to coils, cooling conduits, and the like. The marked propensity of many ramming mixes to shrink has also been considered desirable because this provided a more desnse, impervious, lining structure.

However, in very large vessels, monolithic linings have just not been as satisfactory as desired. Not only have the labor and materials requirements for the formation of monolithic linings been extremely distasteful but, for some unknown reason, there appears to be greater propensity in these larger vessels for the rammed monolith to crack and in other ways rapidly deteriorate.

Accordingly, it is the primary object of this invention to provide improved induction furnace construction practices, and to provide an improved induction furnace.

Refractory linings, in any type of furnace, should have the ability to chemically and physically resist deterioration in service. Chemical resistance is accomplished by judicious selection of refractory ingredients. For example, basic refractory, such as dead burned periclase or magnesia, is used to fabricate the refractory lining when a chemically basic service environment is expected. Nonbasic or acid-type refractory is selected when an acid environment is expected; for example, a high alumina refractory. "High alumina" is understood by those skilled in the art to infer $Al_2O_3$-containing materials containing at least about 50%, by weight, of $Al_2O_3$.

Physical properties or characteristics desirable in the refractory lining to provide optimum service include ability to resist penetration by molten metal and slags, ability to resist attack and penetration by effluent gases, ability to resist rapid and wide cyclic variation in temperature without spalling or cracking, etc. Volume stability, i.e., shrinkage or expansion due to change in the mineralogical character of the refractory when exposed to service temperatures, is also an important consideration.

Briefly, all of the foregoing desirable chemical and physical characteristics are provided according to one aspect of this invention by a novel combination of preformed, burned, refractory shapes and a coreless induction furnace shell. The lining, in essence, consists of two adjacent walls of refractory. A first wall is placed contiguous to the inner surface of the metal shell which defines the furnace. It is a "backup" wall. A second inner or working wall or lining is built over the previously laid backup wall. Further, the two walls are so built that joints between brick are not in direct communication, from one wall to the other, to any appreciable extent.

I have found it very desirable to omit any insulation between the two walls as this provides a very steep thermal gradient. With such an arrangement, the backup wall is almost permanent in character, not normally being exposed to the drastic chemical and physical process parameters of the induction furnace.

In the preferred construction, the backup wall is made of a plurality of substantially identical, generally rectangular shapes which are laid up in the form of rings. Each ring consists of the necessary plurality of identical shapes laid on one of their larger flat surfaces. For example, considering 9″ straights (The 9″ straight to the refractories industry is nominally 9 x 4½ x 2½ or 3 inches), the brick are laid on their 9 x 4½″ faces. The brick in the inner lining which could, for example, also be fabricated of 9″ straights, are not laid in separate rings, but are stood on end, i.e., on one of their 4½ x 2½″ surfaces. Such an arrangement precludes any extensive joint communication between the two walls.

I suggest that the brick be laid up with a good mortar or a dip coat; for example, when considering high alumina brick, of the type disclosed and claimed in Ser. No. 177,305 (now United States Patent No. 3,179,526), entitled "Refractory Bonding Mortar," by J. L. Dolph, filed Mar. 5, 1962, owned by the same assignee as the present invention. For basic brick, I would suggest a silicate bonded periclase or chrome ore mortar.

My furnace construction has a most unexpected attribute. One would expect that the joints between brick in the working wall would provide a ready path through which molten metal might flow. Apparently, nothing could be further from the truth. The joints between brick, which are usually less than ⅛ of an inch, although they may be slightly larger, preferably smaller, while they may allow limited penetration of molten metal, seem to—in combination with inherent operating characteristics of the induction furnace—freeze the metal just as it enters the joints, thereby preventing further penetration. I theorize that in some manner the energy flow generated between the primary coils and the molten metal cannot find a sufficient mass in the joints to maintain the liquid state and, thus, freezing is promoted.

Another interesting discovery is that the limited expansion which occurs in most of the burned refractory brick I suggest in my furnace construction is a desirable thing. According to the prior art, castables and ramming mixes have been used because shrinkage has been considered necessary to provide a more dense and impervious structure. I find that the limited expansion obtained by the individual brick units in my furnace construction tightens up the lining.

The preferred brick for construction of an induction furnace lining according to this invention which is to be nonbasic in service is of the type disclosed and claimed in United States Patent No. 3,067,050, of Eldon D. Miller, Jr., entitled, "Alumina Refractories." Such brick can be used for both the backup and working wall or lining. For a basic environment, I suggest brick of the type disclosed and claimed in United States application Ser. No. 212,992 (now United States No. 3,180,744), of Ben Davies and Frank H. Walther, Jr., filed July 27, 1962. Still further, if desired, one of these two types of brick can be used for the backup and the other for the working lining. One might expect the different mineralogical character of the two brick would make them incompatible. Due to the very desirable thermal gradient mentioned above, however, such is not the case.

Another excellent brick for use in basic environments is that disclosed and claimed (without tar) in the United States patent of Davies, Weaver, and Havranek, No. 3,141,790, entitled, "Burned Basic Refractory Shapes."

Summarizing the advantages of my construction:

(1) The all-brick or preformed shape linings are much safer, because the many small but disconnected joints initially sealed with a good mortar do not allow penetration of molten metal and, in fact, seem to promote freezing of the metal in the joints.

(2) Workmanship in the plant is superior. The many problems of obtaining a uniformly dense, substantially homogeneous structure with ramming mixes is overcome when one uses more carefully preformed, burned brick.

(3) The range of materials (from the metallurgical standpoint) which can be treated in an induction furnace, is increased. Refractoriness and strength of ramming mixes has delimited the metallurgy of induction furnaces. However, by use of my lining construction, a wide range of burned refractory brick, as far as chemistry, refractoriness, and strength are concerned, can be used, considerably broadening the horizon of possible metallurgical systems which can be treated in an induction furnace.

(4) Since the backup wall is more or less a permanent installation, even with equal service life comparing a prior rammed lining and the present construction, there is on the order of 40-50% savings in refractory volume, since only a working lining has to be replaced; and it is easily removed after a service campaign; whereas, with prior art rammed constructions, the whole mass of monolith had to be removed.

(5) In actual service tests in a vacuum induction furnace, linings according to this invention have doubled and tripled furnace campaigns. For example, in a 2000-5000 lb. furnace, the previously expected average life was 15 heats, with a range of perhaps 10-20 heats. Of four linings installed according to this invention, 87 heats were accomplished, and two of them are still in service at this time. This is an average of at least 22 heats. Most likely, this figure will be even higher when the service tests are completed. Examination has shown none of the backup walls to have deteriorated.

(6) Since the original cost of ramming mixes and brick is roughly the same, or even higher for the ramming mix, particularly in view of the specialized labor required, my novel approach provides a 70-80% reduction of refractory cost, at least based on present service experiments.

A further understanding and appreciation of the present invention will be had by reference to the appended drawings. In these drawings:

FIG. 2 is a schematic, sectional, side elevation of the construction of the furnace of FIG. 1;

FIG. 3 is schematically illustrative of a preferred arrangement of brick for the bottom of the furnace.

Figure 1:
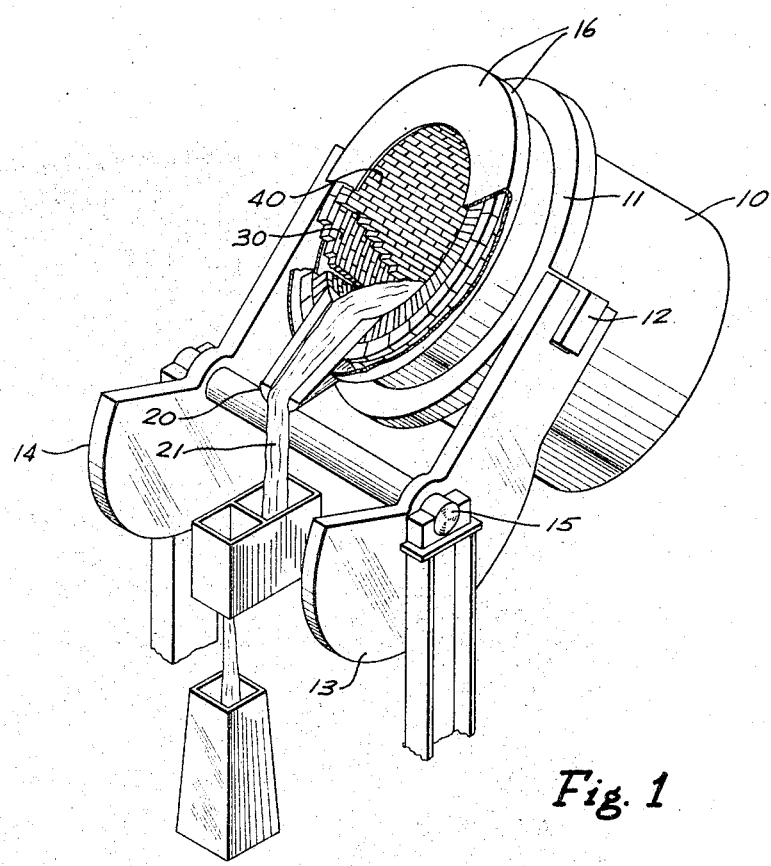
FIG. 1 is a schematic illustration, with some parts broken away to better show relation of parts, of a coreless induction furnace fabricated according to the techniques of this invention.

Before describing the drawings in detail, it should be understood they are but exemplary of preferred practices according to the invention, and that the true spirit and scope of the invention is not to be limited thereto but, rather, is as defined in the hereafter appended claims.

In FIG. 1, I show an induction furnace as it might be positioned to pour a heat of metal. The metal shell 10 is carried in the ring 11, which ring has opposed knobs or lugs 12 engaged in the opposed arms 13 and 14. The arms 13 and 14 are secured to the axle 15 whereby to rotate the furnace for pouring. Adjacent the top of the shell 10 and integrally attached thereto is an enlarged circumferential fitting 16 which includes a flange portion normally disposed contiguous to upper surfaces of the brick forming the interior lining. As is conventional, a trough 20 allows for pouring of a stream of molten metal 21 from the vessel.

The lining, itself, consists of two walls or layers of refractory brick. The outer or backup layer 30 is comprised of a plurality of substantially identical shapes laid in concentric rings. Of course, if desired, conventional refractory key or arch shapes can be used to form the rings. Sometimes it is desirable to include a few of such shapes in each ring to better allow turning of a complete circle.

The inner or working lining 40 is comprised of a plurality of substantially identical refractory brick. These brick are stood on edge. As shown in the drawing, the brick are not aligned in concentric rings but, rather, are staggered to still further assure elimination of any substantial communication between joints in the backup and working lining.

To obtain the staggered construction for the working lining which is shown in FIG. 1, it will be necessary for the bricklayer to break whole brick to provide a series of steps in the first course. Quite surprising, a skilled bricklayer can break brick to quite precise dimensions and, therefore, the rather precise brick dimensions necessary to fabricate a tight working lining are easily obtained. Of course, preformed starter sets can be fabricated by the refractories manufacturer, should such be desired.

In FIG. 2, like reference numerals are used to designate like parts. I have shown the bottom to be constructed of three courses 50, 51, and 52. Composition corresponds to the backup and working lining. FIG. 2 further shows the manner in which the upper peripheral flange of fitting 16 abuts against the upper edges of the two walls. The trough 20 is shown lined with three interlocking special shapes 60, 61, and 62, of generally upwardly opening arcuate configuration. These shapes should be made of a refractory compatible with that used for the working lining. If desired, a castable or ramming mix could be used to line the trough, but I suggest the preformed shapes for best results.

In FIG. 3, I show the preferred manner of constructing the bottom. Note that the lowermost course 50 is shown as consisting of brick laid on edge in courses substantially horizontal to the sheet of drawings. Course 51 is laid in a like manner, but at an angle 45° relative to the horizontal. Course 53 is rotated still another 45° relative to the second course. This is the preferred bottom construction. In general, any arrangement of courses, at least two being required, so arranged to stagger brick in respective courses so there is substantially no continuous interconnected joints between respective courses, can be used. Still further, if desired, one may fabricate the lowermost course of a compatible castable or ramming mix on top of which is laid a course of preformed brick or shapes.

To complete the description of FIG. 2, I have shown a primary coil 80 disposed between the outer shell 10 and the backup lining 30. In operation, current is applied to the primary coil which induces a current in the molten metal or charge which serves as the secondary. This induced current rapidly heats contained metal to a homogeneous charge.

According to good practices, I suggest that the primary coil be coated with a mortar of a refractory compatible with the refractory used in the backup lining.

According to best practice, I consider it important that the refractory shapes used to construct the working lining be of such dimensional tolerance that a mortar joint of no more than about 1/32 of an inch is necessary to lay up the lining.

As indicated in FIG. 2, the bottom-most course 50 and the bottom of the outer wall rest on the same supporting surface. The second course is built within the outer wall and supports the bottom of the working lining. The topmost working course of the bottom is built within the confines of the working lining. In preferred practice, I suggest a fillet 100 be formed with mortar or a castable at the exposed joint between the working lining and the upper or working course of the bottom.

In the foregoing, I have only mentioned three specific types of brick as suited for the practice of this invention. There are many other types of good quality refractory brick which can be used. For example, good quality brick fabricated of such as chrome ore, olivine, forsterite, zircon, zirconia, silicon carbide, and fused shapes of such as alumina, magnesia, chrome ore-magnesia, magnesia-chrome ore, alumina, alumina-zircon, alumina-zirconia, and the like, are usable. Further, while I suggest high alumina brick of the type disclosed in United States Patent No. 3,067,050 as best, other burned, high alumina brick of industry can be used. Further, while I have suggested the direct bonded, high purity, magnesia-chrome ore system of United States application Ser. No. 212,992 (identified above) as the preferred basic shape, it should be understood that other burned chrome ore-magnesia and magnesia-chrome ore shapes of good quality and dimensional tolerance can be used. And yet further, while I have suggested the unimpregnated, burned, magnesite shape of United States Patent No. 3,141,790 as the preferred high MgO brick, it should be understood that other good quality burned magnesia shapes can be used.

While I have shown as preferred a ring construction as the backup wall and a staggered soldier-style arrangement for the working wall, this can be reversed. Also, sloped spiral courses can be used. If spiral-like courses are used for both the backup and the working walls, I suggest they be oppositely directed, i.e., one turning clockwise and the other counterclockwise.

Having thus described the invention in detail and with sufficient particularity as to enable those skilled in the art to practice it, what is desired to have protected by Letters Patent is set forth in the following claims.

I claim:

1. A coreless induction furnace consisting essentially of an outer metal shell in the form of an open-topped tubular vessel, a primary coil disposed adjacent the interior surfaces of said shell, and a composite lining of refractory material, said refractory lining consisting essentially of a plurality of preformed refractory shapes, a first group of said refractory shapes forming a first independent wall about the interior of said outer shell contiguous to said primary coil, a second group of said refractories forming a second independent wall contiguous to said first wall, the preformed shapes of said second wall being arranged to substantially eliminate continuous direct communication between joints in the first and second wall, the joints in at least said second wall being no more than about 1/8" in vertical extent and being filled with refractory mortar compatible with the refractory of which the second wall is constructed, additional refractory forming a plurality of successive and contiguous layers across the bottom of said shell, an uppermost of said bottom courses constructed of preformed refractory shapes and arranged to cooperate with said second wall to form an open-topped, refractory-lined well for containing molten metal, said outer metal shell further including inwardly-extending flange means abutting against and substantially completely overlying all the upper surfaces of the uppermost shapes forming said first and second walls whereby when said furnace is exposed to operating temperatures a limited expansion thereof causes reaction against said flange and commensurate tightening up of the lining.

2. A coreless induction furnace consisting essentially of an outer metal shell in the form of an open-topped tubular vessel, a primary coil disposed adjacent the interior surfaces of said shell and a composite lining of refractory material, said refractory lining consisting essentially of a plurality of preformed refractory shapes, a first group of said refractory shapes forming a first independent wall about the interior of said outer shell contiguous to said primary coil, a second group of said refractories forming a second independent wall contiguous to said first wall, the preformed shapes of said second wall being arranged to substantially eliminate continuous direct communication between joints in the first and second wall, the joints in at least said second wall being no more than about 1/8" in vertical extent and being filled with refractory mortar compatible with a refractory of which the second wall is constructed, the shapes in said first wall being laid in the form of contiguous, sequential rings, the shapes in said second wall being arranged in staggered soldier-style relation, additional groups of preformed shapes forming a plurality of successive and contiguous layers across the bottom of said shell, an uppermost of said bottom courses constructed and arranged to cooperate with said second wall to form an open-topped, refractory-lined well for containing molten metal, said outer metal shell further including inwardly-extending flange means abutting against and substantially completely overlying all the upper surfaces of the uppermost surfaces of the shapes forming said first and second walls whereby when said furnace is exposed to operating temperatures a limited expansion thereof causes reaction against said flange and commensurate tightening up of the lining.

3. A coreless induction furnace consisting essentially of an outer metal shell in the form of an open-topped tubular vessel, a primary coil disposed adjacent the interior surfaces of said shell and a composite lining of refractory material, said refractory lining consisting essentially of a plurality of preformed refractory shapes, a first group of said refractory shapes forming a first independent wall about the interior of said outer shell contiguous to said primary coil, a second group of said refractories forming a second independent wall contiguous to said first wall, the preformed shapes of said second wall being arranged to substantially eliminate continuous direct communication between joints in the first and second wall, the joints in at least said second wall being of such vertical extent as to cause freezing of molten metal therein when the furnace is in operation, refractory mortar compatible with the refractory of which the second wall is constructed initially filling all brick joints therein, additional refractory forming a plurality of successive and contiguous layers across the bottom of said shell, an uppermost of said bottom courses constructed of preformed refractory shapes and arranged to cooperate with said second wall to form an open-topped, refractory-lined well for containing molten metal.

4. The furnace of claim 3 in which the second wall is constructed of burned, high alumina shapes.

5. The furnace of claim 3 in which the second wall is constructed of burned, basic refractory shapes.

6. The furnace of claim 3 in which the first and second walls are fabricated of mineralogically dissimilar, burned refractory shapes.

7. The furnace of claim 3 in which the uppermost of the bottom courses rests on a compatible, rammed, refractory base.

8. The method of building a coreless induction furnace which includes an outer metal shell in the form of an open-topped tubular vessel, comprising the steps of, placing a primary coil adjacent the interior surfaces of said shell, coating said coil with refractory mortar, building a composite lining of refractory material over said coil by: arranging as a series of separate sequential rings, a first group of preformed refractory shapes to form a first independent wall about the interior of said outer shell contiguous to said primary coil, installing a second group of preformed refractories as a second independent wall contiguous to said first wall while assuring the preformed shapes of said second wall are arranged to substantially eliminate extensive direct communications between joints in the first wall and the second wall, joints in at least said second wall being no more than about 1/8" in vertical extent, filling the joints between brick in at least the second wall with refractory mortar compatible with the refractory of said second wall, arranging additional groups of preformed shapes to form a plurality of successive and contiguous layers across the bottom of said shell, the uppermost of said bottom courses cooperating with said second wall to form an open-topped, refractory-lined well for melting molten metal, attaching flange means to said outer metal shell in abutting relation against and substantially completely overlying all upper surfaces of the shapes forming said first and second walls whereby when said furnace is exposed to operating temperatures a limited expansion thereof causes reaction against said flange and commensurate tightening up of the lining.

9. The furnace of claim 3 in which said first and second independent walls are comprised of separate brick arranged in sloped spiral courses, the courses of said first independent wall being oppositely-directed as to rotation as compared to the rotation of the spiral courses of the second independent wall.

References Cited

UNITED STATES PATENTS

| | | | |
|---|---|---|---|
| 2,008,732 | 7/1935 | Summey | 13—30 |
| 2,526,289 | 10/1950 | Smith | 52—249 |
| 3,183,625 | 5/1965 | Agnew | 52—249 |

OTHER REFERENCES

R. Bergmann et al.: Zustellung von Induktionstiegelofen mit Gebrannten Basischen Steinen, Giesserei, No. 22, 1963, pp. 435–437 and English translation.

RICHARD M. WOOD, *Primary Examiner.*

L. H. BENDER, *Assistant Examiner.*